US006680592B2

(12) United States Patent
Blum

(10) Patent No.: US 6,680,592 B2
(45) Date of Patent: Jan. 20, 2004

(54) METHOD AND APPARATUS FOR PRODUCING CURRENT VALUES DEPENDENT ON THE POSITION OF THE ACCELERATOR PEDAL FOR THE PURPOSE OF CONTROLLING THE POWER OF ONE OR MORE DRIVES IN A MOBILE DEVICE WITH A FUEL CELL FOR SUPPLYING ENERGY

(75) Inventor: Joachim Blum, Deizisau (DE)

(73) Assignee: Ballard Power Systems AG, Kirchheim-Nabern (DE)

( * ) Notice: Subject to any disclaimer, the term of this patent is extended or adjusted under 35 U.S.C. 154(b) by 20 days.

(21) Appl. No.: 10/022,815

(22) Filed: Dec. 20, 2001

(65) Prior Publication Data
US 2002/0088654 A1 Jul. 11, 2002

(30) Foreign Application Priority Data

Dec. 20, 2000 (DE) .......................................... 100 63 654

(51) Int. Cl.$^7$ ............................... H02P 5/00; H02P 7/00
(52) U.S. Cl. ....................... 318/139; 318/434; 318/432; 318/433
(58) Field of Search ................................. 318/139, 805, 318/806, 434, 432, 433

(56) References Cited

U.S. PATENT DOCUMENTS

| 5,225,712 A | * | 7/1993 | Erdman ........................ 290/44 |
| 5,624,768 A | * | 4/1997 | Tanokura ...................... 429/23 |
| 5,780,981 A | | 7/1998 | Sonntag et al. |
| 6,075,332 A | * | 6/2000 | McCann ....................... 318/432 |
| 6,469,469 B1 | * | 10/2002 | Chambers et al. ........... 318/801 |

FOREIGN PATENT DOCUMENTS

| DE | 4322765 | 6/1994 | |
| DE | 19540824 | 5/1997 | |
| DE | 10109151 A1 | * 9/2002 | ............ H01M/8/04 |

\* cited by examiner

Primary Examiner—Patrick L Miller
(74) Attorney, Agent, or Firm—Seed IP Law Group PLLC

(57) ABSTRACT

A method and an apparatus produce current values dependent on the position of the accelerator pedal controlling the power of one or more electric drives for moving a mobile device that is energised by a fuel cell. The time required by the drive or drives to respond to a change in the desired current value produced as a function of the position of the accelerator pedal is kept as small as possible by producing a current value—convertible into a desired torque value—which is held continuously at a value sufficient to ensure that the output voltage of the fuel cell just avoids undershooting a critical limit.

10 Claims, 2 Drawing Sheets

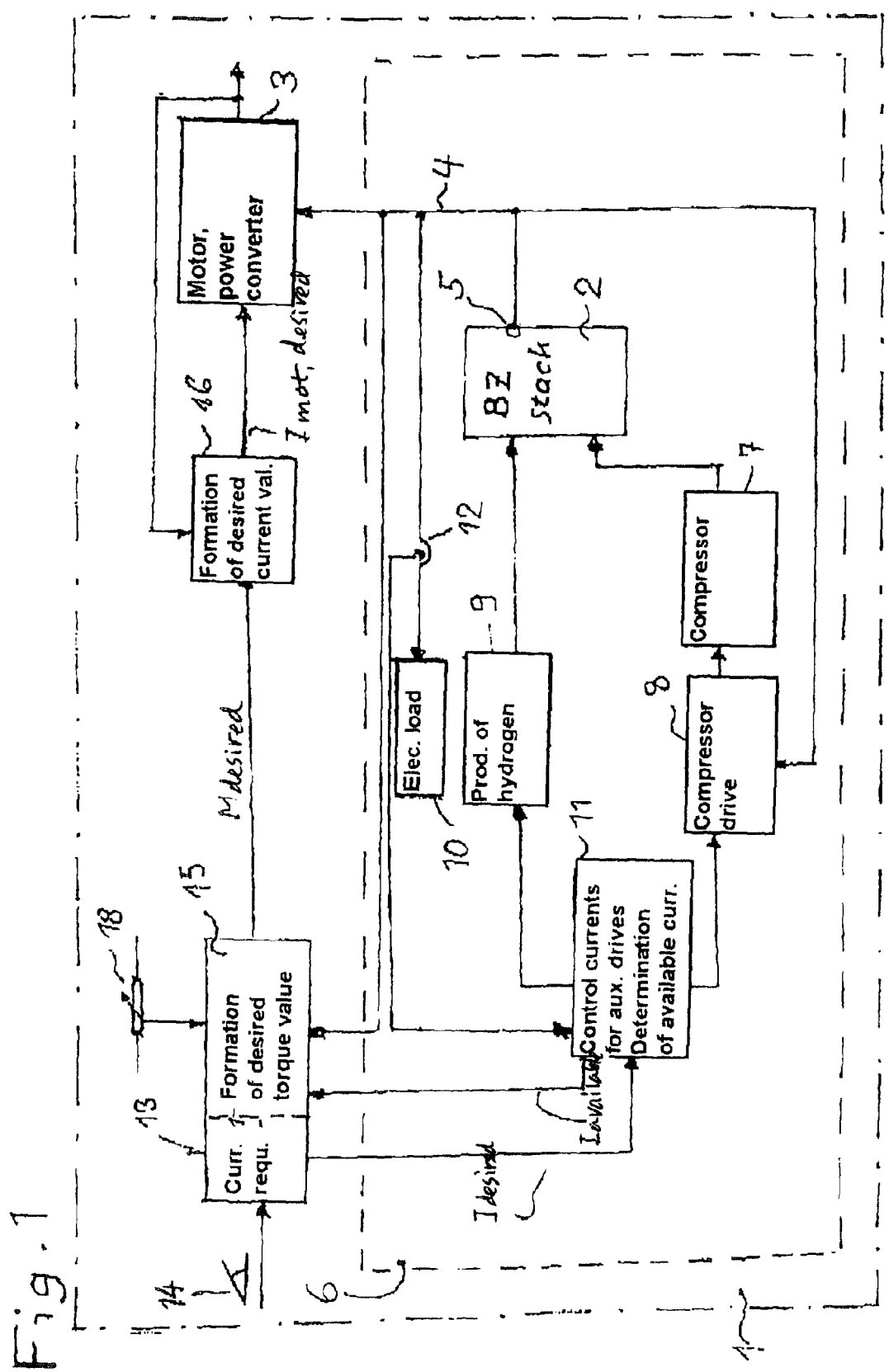

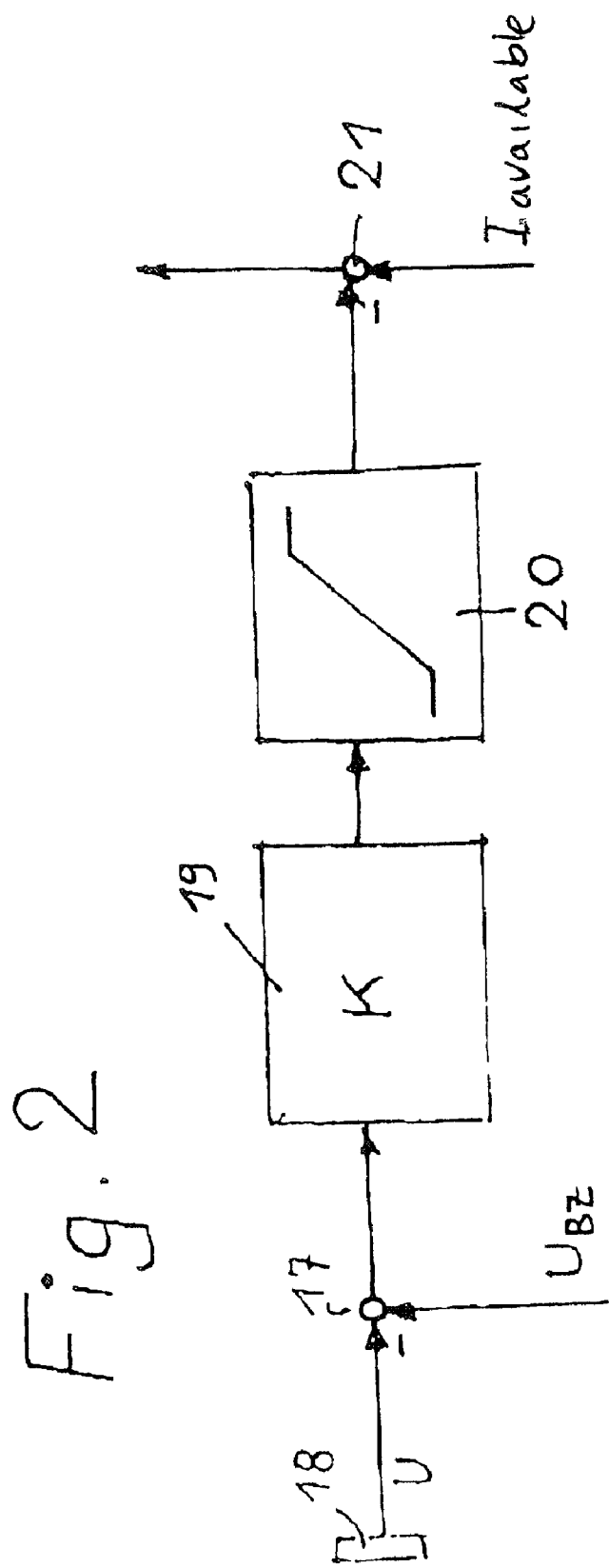

METHOD AND APPARATUS FOR PRODUCING CURRENT VALUES DEPENDENT ON THE POSITION OF THE ACCELERATOR PEDAL FOR THE PURPOSE OF CONTROLLING THE POWER OF ONE OR MORE DRIVES IN A MOBILE DEVICE WITH A FUEL CELL FOR SUPPLYING ENERGY

BACKGROUND AND SUMMARY OF THE INVENTION

This application claims the priority of German Patent Document 100 63 654.3, filed Dec. 20, 2000, the disclosure of which is expressly incorporated by reference herein.

The invention relates to a method and an apparatus for producing current values dependent on the position of the accelerator pedal for the purpose of adjusting the power of one or more drives for moving a mobile device, which has a fuel cell for supplying energy to the drive or drives and to other electrical loads.

The prior art already includes a method for dynamic control of the power of an electric drive unit in a vehicle which is supplied with electrical energy by a fuel cell (DE 43 22 765 C1). The driving powers are associated with the positions of the accelerator pedal. The mass flow of air required to provide the desired driving power is calculated as a function of the position of the accelerator pedal and is supplied by a speed-controlled compressor arranged in the air outlet line of the fuel cell. The desired power value that is fed to the drive unit is corrected to ensure that the drive unit never demands more power than what is instantaneously being produced by the fuel cell. The drive unit can also exercise a limiting action on the power demand. In these known methods, dead times result in a relatively long response time when the vehicle is accelerated.

The prior art also includes a method for dynamic adjustment of the power of a fuel cell in a vehicle that has a drive unit supplied with energy by the fuel cell. A desired value for the power of the fuel cell is determined as a function of a demand at the accelerator pedal. Below a limiting value for the instantaneous voltage of the fuel cell, a desired current value for the fuel cell is determined from the instantaneous speed of the drive motor by means of a characteristic map for the current. Above a limiting value for the instantaneous voltage of the fuel cell, a desired power value is determined from the instantaneous speed of the drive motor by means of a power map for the drive motor, and this desired value is used to determine a desired current value for the fuel cell from the voltage of the fuel cell. The respective currents are increased by a predetermined amount as a function of the currents required by the other electrical units of the vehicle (DE 195 40 824 A1).

Fuel-cell system s that have compressors for adjusting the mass flow of air exhibit certain delays in their response. Delays also occur if the fuel gas for the fuel cell is supplied by a system for the production of hydrogen gas. The response time of the fuel-cell system in the vehicle must be taken into account when producing the desired current value. Releasing the respectively required desired current value too quickly leads to a collapse in the voltage of the fuel cell and hence to a malfunction. Excessively slow release of the desired current value associated with a particular position of the accelerator pedal does not exploit the potential response time.

The response time of the fuel-cell system depends on numerous factors. Some of these factors are the instantaneous load level, the type of current or power demand, i.e. the time characteristic of the demand, such as a jump or ramp, the rate of rise and the instantaneous condition of the fuel-cell system. The parameters that influence the response time here are numerous. At the time when the current is demanded, not all of them are known. Determining all the parameters is possible only with a high outlay.

To avoid malfunctions in the case of rapidly changing current demands, a fixed transfer characteristic can be set in one element of a control circuit, e.g. an $x^{th}$-order delay can be provided.

One object of the invention is to provide a method for producing current values as a function of the position of the accelerator pedal for the purpose of adjusting the power of one or more drives for moving a mobile device.

Another object of the invention is to achieve an optimum dynamic response, without explicitly determining the parameters that influence the response of the fuel cell.

These and other objects and advantages are achieved by the method and apparatus according to the invention, which comprise the steps of measuring the output voltage of the fuel cell during a change in a desired current value as a function of the position of the accelerator pedal and monitoring the output voltage against a lower limiting voltage value, reducing the desired current value by the amount of current drawn by the other electrical loads and the current required to adjust the power of the fuel cell to the driving power corresponding to the desired current value and adjusting the remaining part of the desired current value, as the available current for the production of a corresponding desired torque value, in such away that the limiting voltage value is not undershot to a degree that would impair the operation of the drive or drives and the other current-consuming loads. In the adjustment of the available current value in relation to the limiting voltage value, an optimum, i.e. minimum, rise time of this current value is achieved without the fuel cell or drives and the other electrical loads of the fuel-cell system adopting an unwanted operating condition. In the case of a change in the position of the accelerator pedal, the dynamic response of the fuel-cell system (i.e. the fuel cell and the loads supplied) depends on the current demand of the fuel cell and of its auxiliary units and on the respective operating condition of the other electrical loads of the fuel-cell system. By means of the invention, an optimum dynamic response is achieved without the need explicitly to determine or model all the requirements and/or dependencies of the electrical loads in the respective operating condition. The requirements or dependencies are allowed for automatically by the invention, with the result that the outlay for setting and parameterizing the fuel-cell system is low.

The lower limiting voltage value is preferably the rated or operating voltage of the electrical loads supplied by the fuel cell. The electrical loads in the mobile device thus maintain the rated or operating voltage even during the transition of the fuel-cell system and the drives to a different operating condition. During the change in the desired current value, the value of the available current is sufficient to ensure that the loads in the fuel-cell system, including the drive or drives, can draw the currents required for them to operate satisfactorily. As a result, the drive or drives change to the new operating condition in as short a time as possible. It should be pointed out here that other means for adjusting the power of a drive, such as manually actuated members, are equivalent in mobile devices to the foot-actuated accelerator pedal.

In a preferred embodiment, the output voltage of the fuel cell is held at a value that is uncritical for the operation of the drive or drives and the fuel-cell system by adjusting the available current by closed-loop control, at least during the change in a desired current value. This method ensures that the output voltage of the fuel cell does not fall below a critical value to an extent that would be undesirable for the operation of the fuel-cell system, if at all. The available driving-current value is controlled in the optimum manner, with the result that the drive or drives make the transition to the new operating condition, e.g. a new speed or power, in as short a time as possible.

In an expedient embodiment, the available current value is adjusted in such a way during the change in the desired current value that the first or second derivative of the output voltage of the fuel cell with respect to the current value remains the same. With this method, it is possible to achieve a desired driving response when changes in the position of the accelerator pedal occur. By controlling the second derivative of the output voltage of the fuel cell in accordance with the available current value, for example, it is possible to achieve jerk-free adjustment of the power or speed during the transition to new speed or power values. It is advantageous here to provide a cascade control system, the control of the output voltage of the fuel cell taking place in an outer control circuit.

In an apparatus of the present invention, a control element is supplied with the deviation formed from the difference between the lower limiting voltage value and the output voltage of the fuel cell. A current value, proportional to the deviation and having a current-limiting characteristic, is superimposed by the controller on the available current to produce a correct current value that is available for conversion to a desired torque value. The available current, as discussed above, is the difference between the desired current value and the sum of the currents drawn by the auxiliary units of the fuel cell and the currents drawn by the other loads. With this controller, it is possible to achieve an optimum dynamic response from the fuel-cell system; i.e., the response time of the drive or drives after changes in the operating point is as short as possible. The lower limiting voltage value is, in particular, the rated or operating voltage of the electrical loads and of the drive. The word "drive" should here be taken to mean the unit consisting of a power converter and a motor.

The controller has a proportional action. A current proportional to the negative deviation is therefore subtracted from the current available to form the torque of the drive. It is advantageous for many applications if the profile of this current value has a particular characteristic. Steady changes in power or speed may be desired, for example. In such a case, a controlled or secondary controlled variable can be the first derivative of the output voltage of the fuel cell with respect to the current. Jerk-free behaviour can be achieved by using the second derivative of the output voltage of the fuel cell with respect to the available current as controlled or secondary controlled variables.

Other objects, advantages and novel features of the present invention will become apparent from the following detailed description of the invention when considered in conjunction with the accompanying drawings.

BRIEF DESCRIPTION OF THE DRAWINGS

FIG. 1 shows a block diagram of a mobile device with an electric drive and a fuel-cell system with auxiliary units for operating a fuel cell and with further loads supplied by the fuel cell.

FIG. 2 shows in a block diagram a detail of the device illustrated in FIG. 1.

DETAILED DESCRIPTION OF THE DRAWINGS

A mobile device 1, preferably a motor vehicle, contains as an energy source a fuel cell 2, which is referred to in FIG. 1 as a fuel-cell stack (BZ stack), since it is made of individual PEM modules, for example, which are connected in series. In the device 1 there is at least one drive 3 for moving the device 1. This drive includes an electric motor having a power converter on its input side and drives wheels of the device, for example. Depending on the type of electric motor, the power converter is designed as a converter or an inverter in order, for example, to supply a DC or AC motor. With its power supply inputs, the power converter is connected to an electrical network, which is illustrated in simplified form in FIG. 1 and denoted by 4. The network 4 is connected to the electrical outputs 5 of the fuel cells via a circuit breaker or switch disconnector (not shown). The fuel cell 2 is part of a fuel-cell system, denoted by 6 in FIG. 1, in the mobile device 1. The fuel-cell system 6 includes a compressor 7 for feeding air into the fuel cell 2. The compressor is connected to a drive 8, which has an electric motor (not shown) with a power converter on its input side, the power-supply inputs of which, like the drive 3, are connected to the outputs 5 via the circuit breaker or switch disconnector.

The fuel-cell system 6 includes a hydrogen supply device 9, which, in the simplest case is a tank which is filled with hydrogen and is connected to an input of the fuel cell 2 via a line with a control valve. However, the hydrogen supply device 9 can also be a reforming system which separates hydrogen gas from a hydrocarbon.

To facilitate understanding of the invention under consideration, the fuel-cell system 6 also has other loads, which are arranged in the network 4 and are supplied with current by the fuel cell 2. These loads are, for example, the electric drive of a coolant pump, a heating circuit or the electrical components of an air-conditioning system in the device 1. The electrical loads that are supplied by the fuel cell 2 in addition to the drive 3 are denoted overall by 10 in FIG. 1.

The fuel-cell system 6 includes a control module 11, outputs of which are connected to control inputs (not shown specifically) of the compressor drive 8 and further outputs of which are connected to control inputs (not shown specifically) of the hydrogen production system 9.

Inputs of control module 11 are connected to a current sensor for the current fed into the loads 10 and to a control module 13, the input of which is connected to an angular position transducer of an accelerator pedal 14. The torques of the drive motor of the device 1 is a function of the different angular position of the accelerator pedal. From the torque associated with the position of the accelerator pedal and the motor speed, control module 13 determines a desired current $I_{desired}$ by means of stored characteristic maps or calculation. This desired current is used to determine respective control currents for the supply of air and fuel gas to the fuel cell 2 in accordance with predetermined values in characteristic maps. The control currents influence the drive 8 and the hydrogen production device 9 in such a way that the fuel cell produces the power that is required by the drive 3 to output the torque determined by the position of the accelerator pedal. The control module 11 determines a current value $I_{available}$, which is the current available for the drive 8, based on the current $I_{desired}$, the currents required to control the fuel cell 2 and the current supplied to the loads 10 by the fuel cell 2. The control module 11 then feeds this value into the control module 15.

From the current $I_{available}$, which is corrected in a manner described in greater detail below, and the angular position of the accelerator pedal 14, the control module calculates a desired torque value $M_{desired}$, which is applied to a control module 16. Based on the desired torque value $M_{desired}$ and the measured speed, the control module 16 calculates a desired motor current value $I_{mot.desired}$, which is fed to the drive 3 to produce the power associated with the position of the accelerator pedal. Control modules 11, 13, 15 and 16 can be parts of a control unit. The production of a desired motor current value from a predetermined desired torque value is known per se.

The output voltage of the fuel cell lags behind the inputting of a new desired current value $I_{desired}$ because of delays inherent in the components between control module 13 and the fuel cell 2 and delays in the fuel cell 2 itself. After the production of an angular position value corresponding to a higher torque, if the drive 3 is operated immediately with a corresponding desired current value $I_{mot.desired}$, it would demand a power that could not be supplied by the fuel cell 2, given the required level of the operating voltage. Therefore, the desired current value $I_{mot.desired}$ is produced with a delay. This delay is brought about as follows:

A control circuit which is implemented in the control module 15 has a summing point 17 which is supplied by a desired-value transmitter 18 with a predetermined limiting voltage $U_{min}$ for the output voltage of the fuel cell and by a transmitter that is not shown with the value of the output voltage $U_{BZ}$ of the fuel cell. At the summing point 17, which can be implemented by software in a computer, the value of the measured voltage $U_{BZ}$ of the fuel cell is subtracted from the desired voltage value $U_{BZ}$. The desired voltage value $U_{BZ}$ corresponds to a lower limiting value of the output voltage of the fuel cell which must not be undershot to any great extent, if at all, if the fuel cell and the loads are to operate satisfactorily. The deviation $U_{min}-U_{BZ}$ is supplied to a controller 19 in control module 15, which controller can likewise be implemented by means of software. The controller 19 has a proportional action, this being indicated in block 19 by the letter K. The controller 19 furthermore has a limiting element 20.

The controller 20 produces a current value that is proportional to the deviation and is fed to another summing point 21 which can likewise be implemented by means of software. The summing point 21 is also supplied with the current value $I_{available}$, from which the output current of the controller 19 or 20 is subtracted. This gives a corrected current value $I'_{available}$. The output current value of the controller 10 is limited to the value 0 and a current $I_{max}$ by the limiting element. From the corrected value $I'_{available}$, control module 15 determines the desired torque value $M_{desired}$, from which the desired current value $I_{mot.desired}$ is formed, this being a measure of the driving power.

The control system described above prevents the fuel-cell output from falling below the lower limiting voltage value $U_{min}$ during or after the demand for a higher torque from the drive 3 via the position of the accelerator pedal by reducing the available driving current value. $I_{available}$ by a current proportional to the undershooting of $U_{min}$. The lower limiting value $U_{min}$ is set to the rated or operating voltage of the electrical loads on the network 4, including the power converter of the driving motor or is stored in control module 15.

If a higher torque or power is demanded of the drive 3 by an appropriate change in the accelerator pedal, the transition to this power takes place without a critical operating threshold for the output voltage of the fuel cell being undershot and with an optimum dynamic response. It is not necessary for all the influencing variables to be explicitly determined by measurements or modelled at each operating point of the fuel-cell system. Instead, they are automatically allowed for. The outlay required for setting and parameterizing the control system is low.

If a continuous transition between different powers of the drive is desired, the first derivative of the output voltage of the fuel cell with respect to the current $I_{available}$ can be introduced as a secondary controlled variable in a cascade control system. A jerk-free transition can be achieved with the second derivative $d^2U/DI^2_{available}$ as the secondary controlled variable.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a current value as a function of position of an accelerator pedal for adjusting power of at least one drive of a mobile device having a fuel cell for supplying energy to the at least one drive and electrical loads, the method comprising:

measuring an output voltage of the fuel cell during a change in a desired current value as a function of the position of the accelerator pedal;

comparing the output voltage of the fuel cell to a lower limiting voltage value;

reducing the desired current value by an amount equalling the sum of a current drawn from the fuel cell by the electrical loads and a current required to adjust the power of the fuel cell to a driving power corresponding to the desired current value; and adjusting the reduced desired current value so as not to impair the operation of the at least one drive and the electrical loads while the at least one drive is emitting power in accordance with a desired torque value.

2. The method according to claim 1, wherein the step of adjusting the reduced desired current value includes adjusting the reduced desired current value so as not to undershoot the lower limiting voltage value to a degree that would impair operation of the at least one drive and the electrical loads while the at least one drive is emitting power in accordance with the desired torque value.

3. The method according to claim 1, wherein the reduced desired current value is an available current value for the production of the desired torque value.

4. The method according to claim 1, wherein the lower limiting voltage value is a rated or operating voltage of the electrical loads supplied by the fuel cell.

5. The method according to claim 3, further comprising holding the output voltage of the fuel cell at a value that is uncritical for the operation of the at least one drive, the electrical loads and the fuel-cell, by adjusting the available current value by closed-loop control during the change in the desired current value.

6. The method according to claim 3, further comprising adjusting the available current value in such a way during the change in the desired current value that a first derivative of the output voltage of the fuel cell with respect to the current value remains the same.

7. The method according to claim 3, further comprising adjusting the available current value during the change in the desired current value, in such a way that the a second derivative of the output voltage of the fuel cell with respect to the current value remains the same.

8. An apparatus for producing a current value as a function of position of an accelerator pedal for adjusting the power of at least one drive for moving a mobile device having a fuel cell for supplying energy to the at least one drive and electrical loads, the apparatus comprising:

a controller having an input and an output, the input including the difference between a lower limiting voltage value and a measured output voltage of the fuel cell; wherein the controller superimposes a current, which is proportional to the difference and has a current-limiting characteristic, on an available current to produce a corrected current value that is used to determine a desired torque value; and the available current is a difference between a desired current, which is associated with a predetermined power or speed of the at least one drive, and the sum of currents required for this power by auxiliary units of the fuel cell and currents drawn by the loads.

9. The apparatus according to claim 8, wherein the output of the controller is limited by a limiting element between zero and a maximum current value (Imax).

10. An apparatus for producing a current value as a function of position of an accelerator pedal for adjusting the power of at least one drive for moving a mobile device having a fuel cell for supplying energy to the at least one drive and electrical loads, the apparatus comprising:

means for measuring an output voltage of the fuel cell during a change in a desired current value as a function of the position of the accelerator pedal;

a unit for comparing the output voltage of the fuel cell with a lower limiting voltage value; and a controller programmed to reduce the desired current value by an amount equalling the sum of a current drawn from the fuel cell by the electrical loads and a current required to adjust the power of the fuel cell to a driving power corresponding to the desired current value, and to adjust the reduced desired current value so as not to impair the operation of the at least one drive and the electrical loads while the at least one drive is emitting power in accordance with a desired torque value.

* * * * *

UNITED STATES PATENT AND TRADEMARK OFFICE
CERTIFICATE OF CORRECTION

PATENT NO. : 6,680,592 B2
DATED : January 20, 2004
INVENTOR(S) : Joachim Blum

It is certified that error appears in the above-identified patent and that said Letters Patent is hereby corrected as shown below:

Column 7,
Line 5, "that the a second" should read -- that a second --

Signed and Sealed this

Twentieth Day of July, 2004

JON W. DUDAS
*Acting Director of the United States Patent and Trademark Office*